US012802115B2

(12) United States Patent
Zubcevic et al.

(10) Patent No.: US 12,802,115 B2
(45) Date of Patent: Nov. 17, 2026

(54) VIRTUAL MARKETPLACE FOR DENTAL LABS

(71) Applicant: 3SHAPE A/S, Copenhagen (DK)

(72) Inventors: Samir Zubcevic, Copenhagen (DK); Nina Pytter Laursen, Copenhagen (DK); Kasper Lee Hartmann, Copenhagen (DK); Mike Slotsborg, Copenhagen (DK); Martha Cecilia Fernandez Contreras, Copenhagen (DK); Ege Buyuksemerci, Copenhagen (DK)

(73) Assignee: 3SHAPE A/S, Kobenhavn K (DK)

( * ) Notice: Subject to any disclaimer, the term of this patent is extended or adjusted under 35 U.S.C. 154(b) by 93 days.

(21) Appl. No.: 18/583,420

(22) Filed: Feb. 21, 2024

(65) Prior Publication Data

US 2024/0281865 A1 Aug. 22, 2024

(30) Foreign Application Priority Data

Feb. 22, 2023 (DK) ............................ PA202370097

(51) Int. Cl.
*G06Q 30/00* (2023.01)
*G06Q 30/0601* (2023.01)
*G06Q 50/04* (2012.01)

(52) U.S. Cl.
CPC ......... *G06Q 30/0631* (2013.01); *G06Q 50/04* (2013.01)

(58) Field of Classification Search
None
See application file for complete search history.

(56) References Cited

U.S. PATENT DOCUMENTS

| | | | | |
|---|---|---|---|---|
| 11,748,800 | B1 * | 9/2023 | Yuan | G16H 50/70 705/26.7 |
| 2012/0065985 | A1 | 3/2012 | Royal et al. | |
| 2014/0032233 | A1 | 1/2014 | Johnson et al. | |
| 2014/0157579 | A1 | 6/2014 | Chhabra et al. | |
| 2014/0372134 | A1 | 12/2014 | Dahr | |
| 2015/0332018 | A1 | 11/2015 | Rosen et al. | |
| 2022/0304782 | A1 * | 9/2022 | Derzapf | A61C 13/0006 |
| 2023/0410179 | A1 * | 12/2023 | Yuan | G16H 50/70 |
| 2024/0145071 | A1 * | 5/2024 | Hess | G16H 50/70 |

* cited by examiner

*Primary Examiner* — Mila Airapetian
(74) *Attorney, Agent, or Firm* — Buchanan Ingersoll & Rooney PC

(57) ABSTRACT

A virtual venue for dental products is described including the creating of product-specific catalogs by receiving standardized information from two or more labs which create the dental products. The virtual venue may recommend certain products to labs based upon various attributes. The virtual venue may add to a workflow generating a case so as to meet the attributes of a preferred lab.

17 Claims, 9 Drawing Sheets

VIRTUAL MARKETPLACE FOR DENTAL LABS

TECHNICAL FIELD

The present disclosure relates to methods, systems, and computer program products for a virtual marketplace.

BACKGROUND

Dental laboratories ("labs") provide services for dental providers, such as dentists or orthodontists. The dental labs may, among other things, produce any of various dental products for specific patients. Typically, a dental provider will work with one or two dental labs to fulfill orders that are manually placed. Manually placing the orders also requires substantial communication between lab and clinic based on missing information, unclear instructions, questions about offerings, and other ambiguities. What is lacking in the art is a technical solution for the dental labs to provide a listing of all offered products as well as the requirements thereof. Also lacking is a technical solution for dental providers seeking to compare and find a dental lab for certain products.

SUMMARY

Embodiments of the invention solve the above-mentioned problems by providing a virtual marketplace. The virtual marketplace receives structured information about the products offered by dental labs. This information may be organized into lab-specific catalogs (for multiple products at a given labs) and/or product-specific catalogs (for the multiple labs for a given product). In some embodiments, incoming requests identify one or more offered product to fulfill that request and what lab can provide them. In other embodiments, a preferred lab for a product type allows for attributes of the product to be added to the workflow in generating the order form for the preferred lab. The virtual marketplace may further facilitate the sending of additional information and facilitate communication between the dental lab and the dental provider. Thus, embodiments described herein provide technical solutions and practical applications to real-world problems encountered by dental labs and dental providers.

A first embodiment of the invention is broadly directed to a computerized method. The method may include receiving, from a first lab, a first set of offered products. The method may include receiving, from a second lab, a second set of offered products. The method may include receiving, from a dental provider, a digital scan model indicative of a dental condition and a course of treatment of a patient. The method may include determining, based at least in part on the digital scan model, a course of treatment for the patient based at least in part on the digital scan model. The method may include sending, to the dental provider, a first recommended product from the first set of offered products and a second recommended product from the second set of offered products. The method may include receiving, from the dental provider, a selection of the first recommended product. The method may include receiving, from the dental provider, an additional data set associated with requirements for the first recommended product. The method may include sending, to the first lab, the selection of the first recommended product, the digital scan model, and the additional data set.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in, nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

DETAILED DESCRIPTION

Figure 1A:
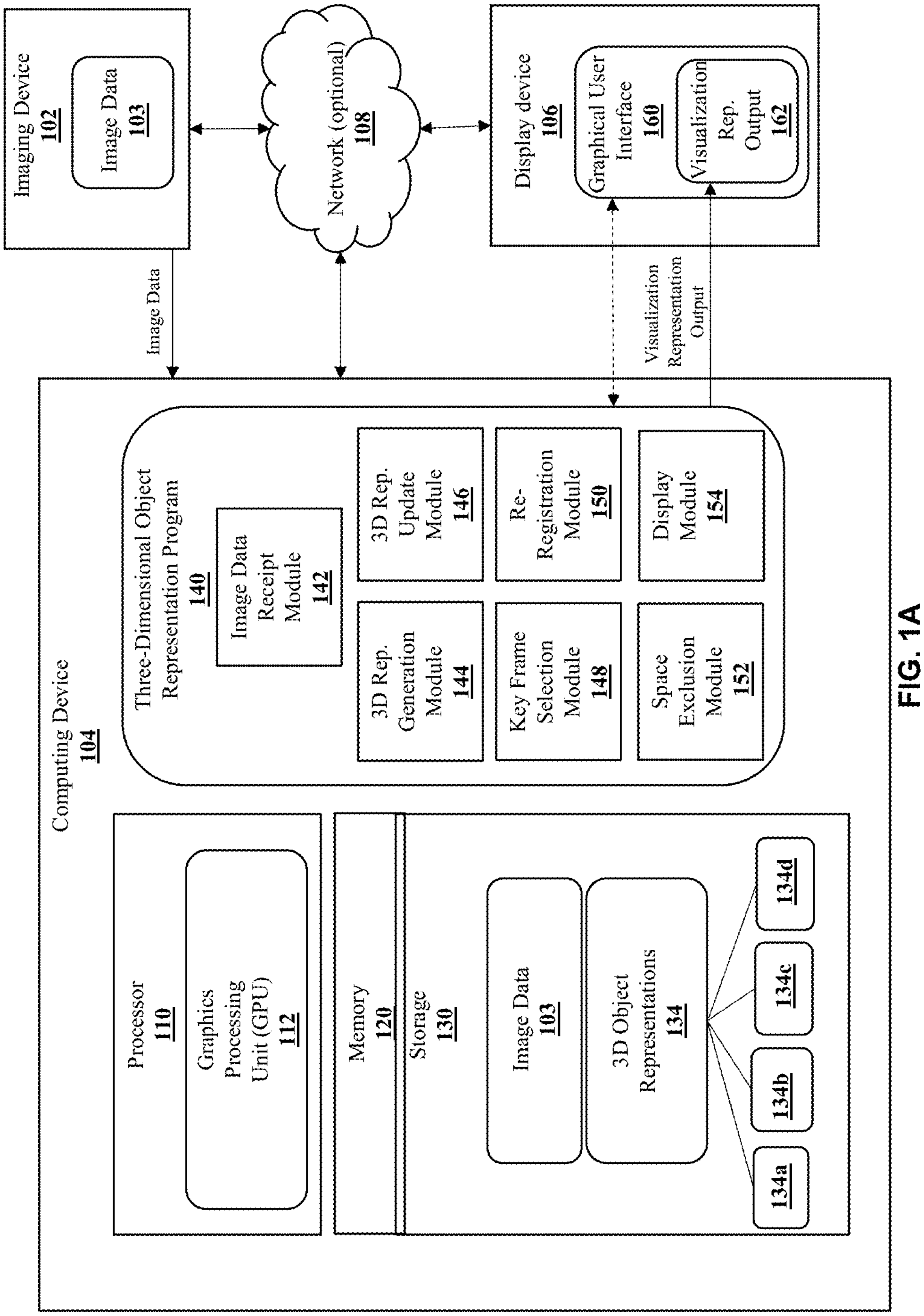
FIG. 1A illustrates a high-level system architecture for configuring a computer for generating a digital three-dimensional representation of a dental object during scanning with a dental imaging device in accordance with exemplary embodiments.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference. Use of directional terms such as "upper," "lower,", "top", "bottom", "above," "below", "front", "forward", "left" or "right", and etc. are intended merely for orientation, to describe the positions and/or orientations of various components to one another, and are not intended to impose limitations on any position and/or orientation of any embodiment of the invention relative to any reference point external to the reference.

As discussed above, current methods and technologies in the realm of virtual marketplaces. Generally, in embodiments, the virtual marketplace will request and then analyze information about the offered products provided by various dental labs. The information is standardized such that comparisons between the offered products can be performed by the system and/or the dental provider.

The dental professional includes any entity, either a legal person or natural person, or a computer program adapted to taking scans or providing other medical services. Examples of dental professionals include, but are not limited to, the following: a company, such as a dentistry practice, or an employee or agent of such a company; software adapted to take scans or other medical documents; and a person, legal or natural, who advises or assists the patient in preparing their own dental scan. The dental professional may also comprise a database for storing at least a portion of the set of patient information.

The laboratory is an entity that produces dental products, which may be used by the dental provider on the patient, or used by the patient directly. The laboratory may use the virtual venue to attempt to sell goods to the patient, an attempt to sell services to the patient, an attempt to enter into a contractual relationship with the patient. The dental professional refers to the dental professional responsible for generating and/or saving the specific dental scan. For example, the dental professional could act as a laboratory in which the patient has utilized the services of a different dental professional to generate the dental scan upon which the information is located.

In one embodiment, the patient and/or dental provider is presented with the option to participate in the virtual marketplace before the computer program receives the information about the patient. In other embodiments, the computer program receives the information automatically at or near the storing of the dental scan, for example, when the dental professional prepares and submits the dental scan via a computer-based system.

The set of patient information that is received by the computer program comprises the dental scan or information extracted from the dental scan, and may include a treatment plan if such has already been created. The set of patient information may also include dental scans from previous times and other patient information. In yet other embodiments, the set of patient information received by the computer program further comprises qualitative data, contact information, and/or demographic information of the patient. In some embodiments, all of the information is received by the computer program as a single set. In other embodiments, the computer program may query the user to input the set of additional information.

Figure 1B:
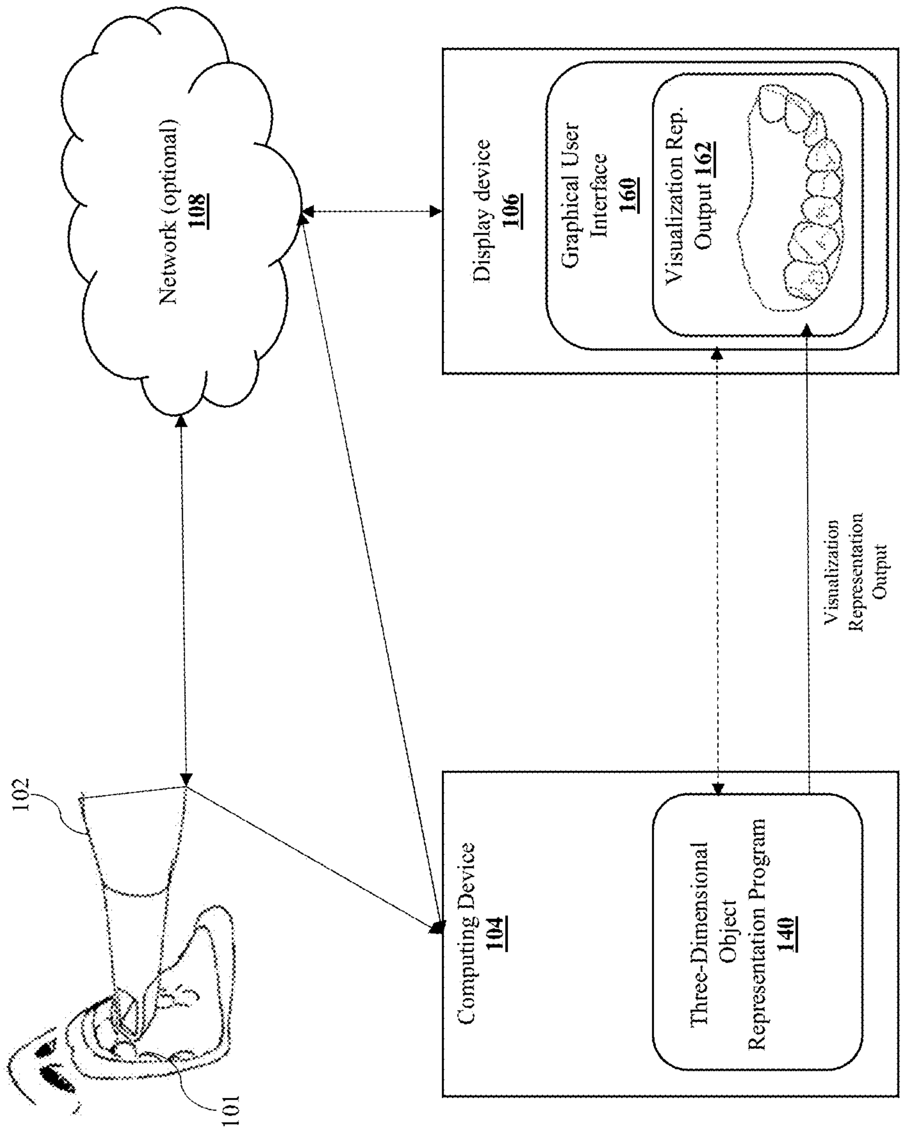
FIG. 1B illustrates an example system for generating a digital three-dimensional representation of a dental object during scanning with a dental imaging device in accordance with exemplary embodiments.
Figure 2:
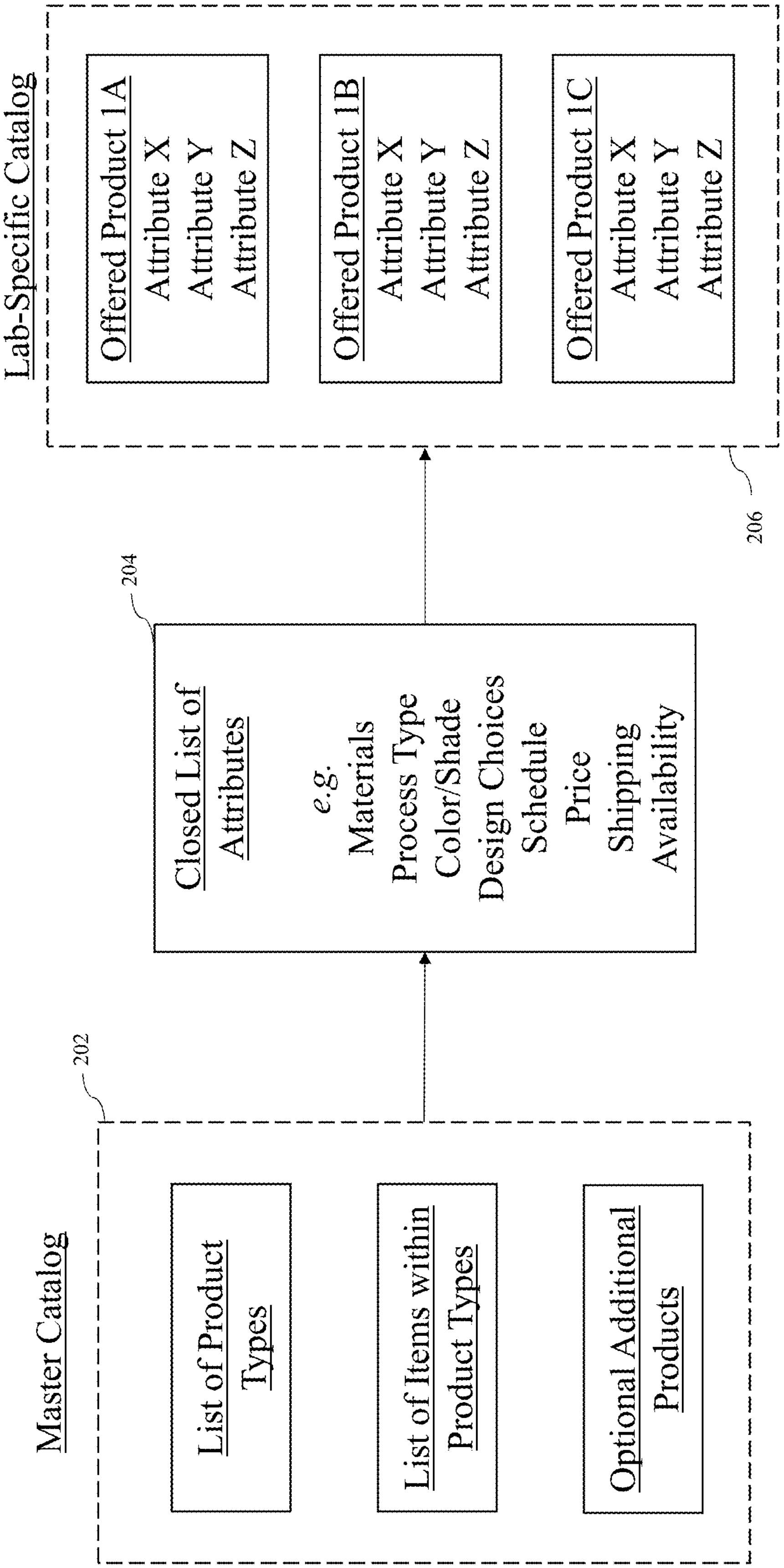
FIG. 2 is a flow chart illustrating a process of generating a lab-specific catalog in accordance with example embodiments.
Figure 3A:
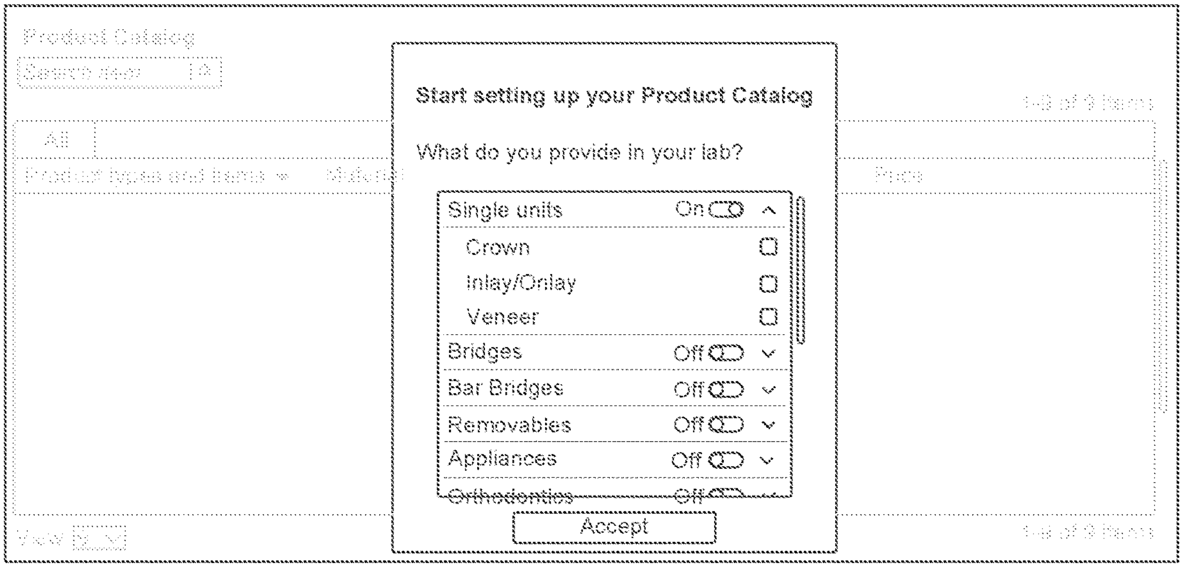
FIGS. 3A-B are example graphical user interfaces for requesting and receiving offered product information in accordance with example embodiments.
Figure 3B:
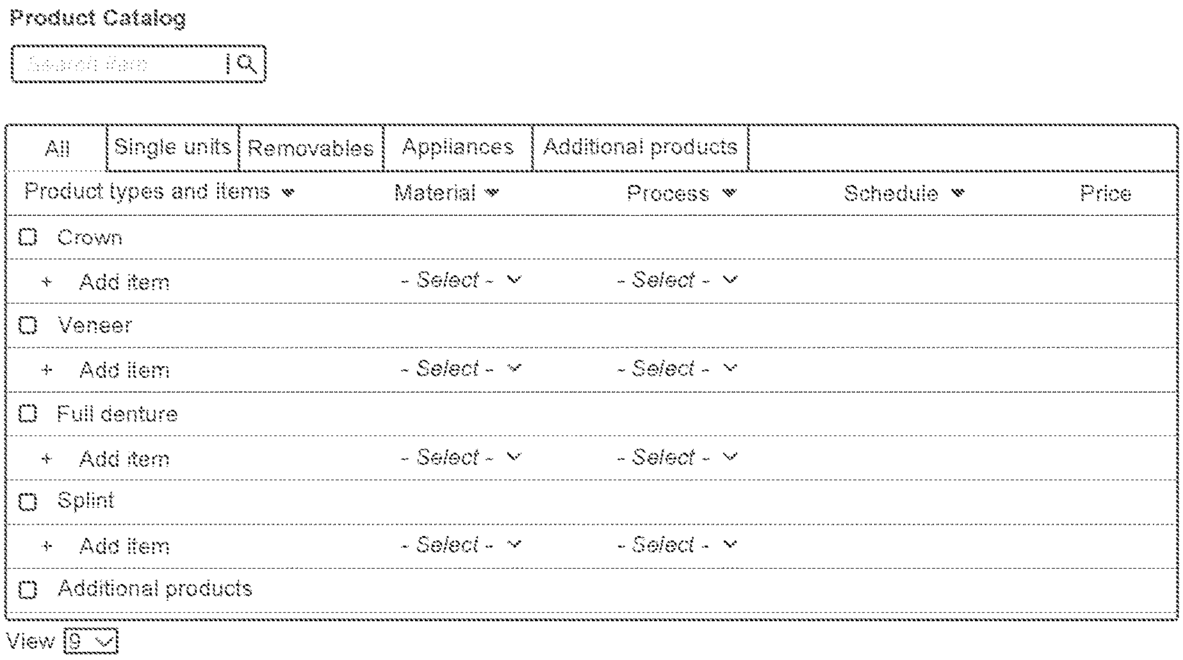
Figure 4:
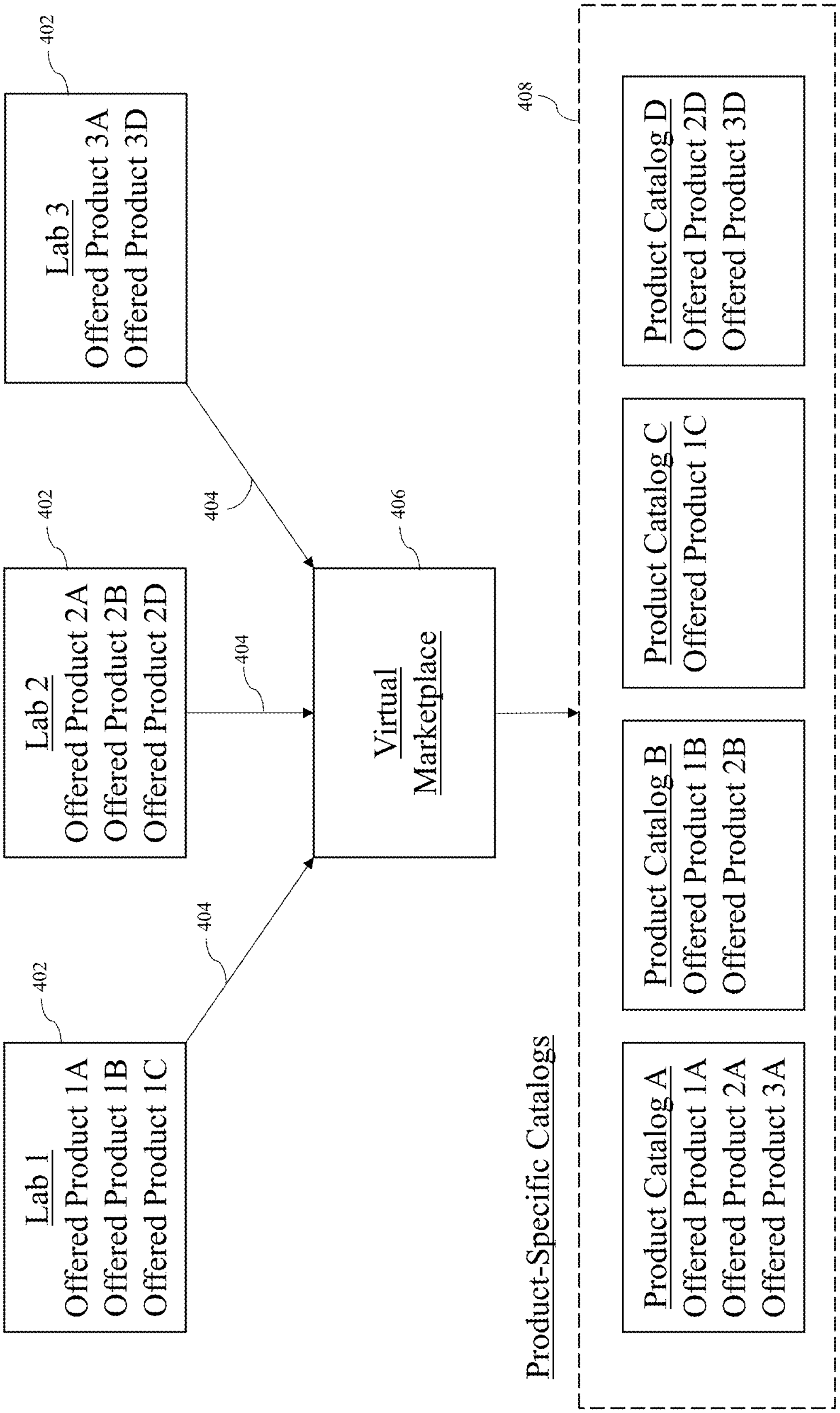
FIG. 4 is a flow chart illustrating a process of obtaining, analyzing, and organizing the offered products by dental labs into product-specific catalogs in accordance with example embodiments.
Figure 5A:
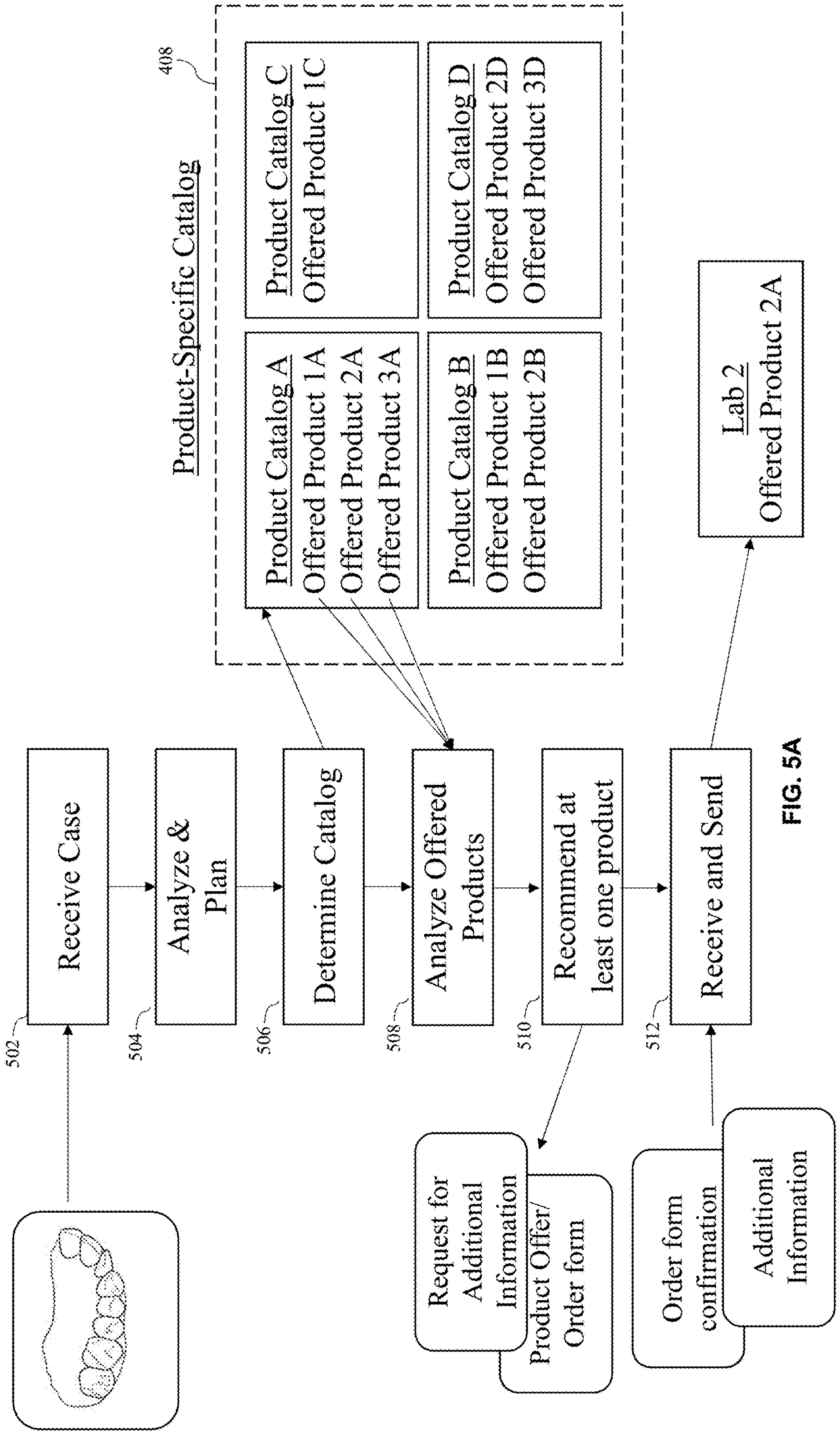
FIG. 5A is a flowchart illustrating a method for selecting and ordering a product based upon the product-specific catalog in accordance with example embodiments.
Figure 5B:
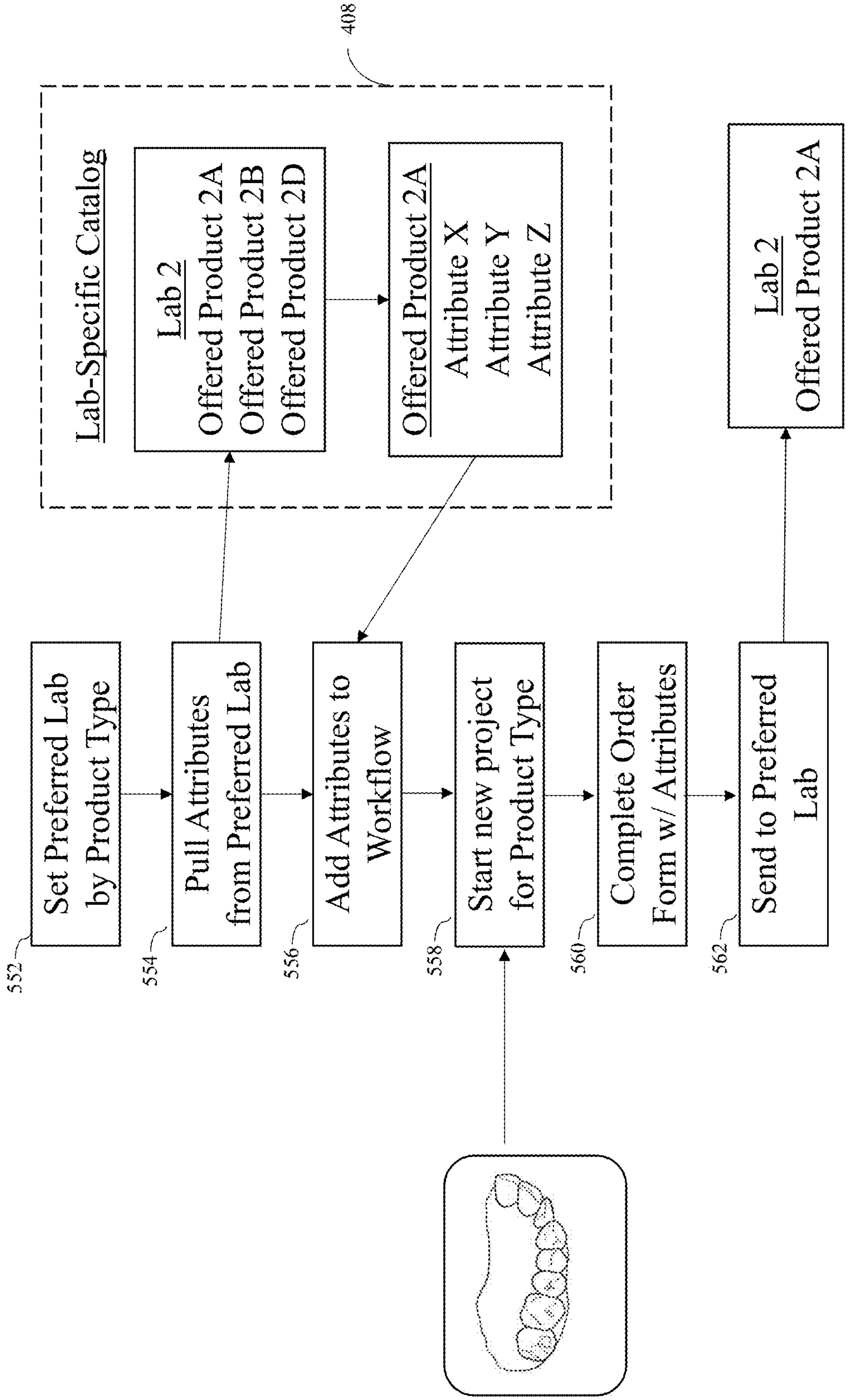
FIG. 5B is a flowchart illustrating a method for selecting an ordering a product based upon the lab-specific catalog in accordance with example embodiments.
Figure 6:
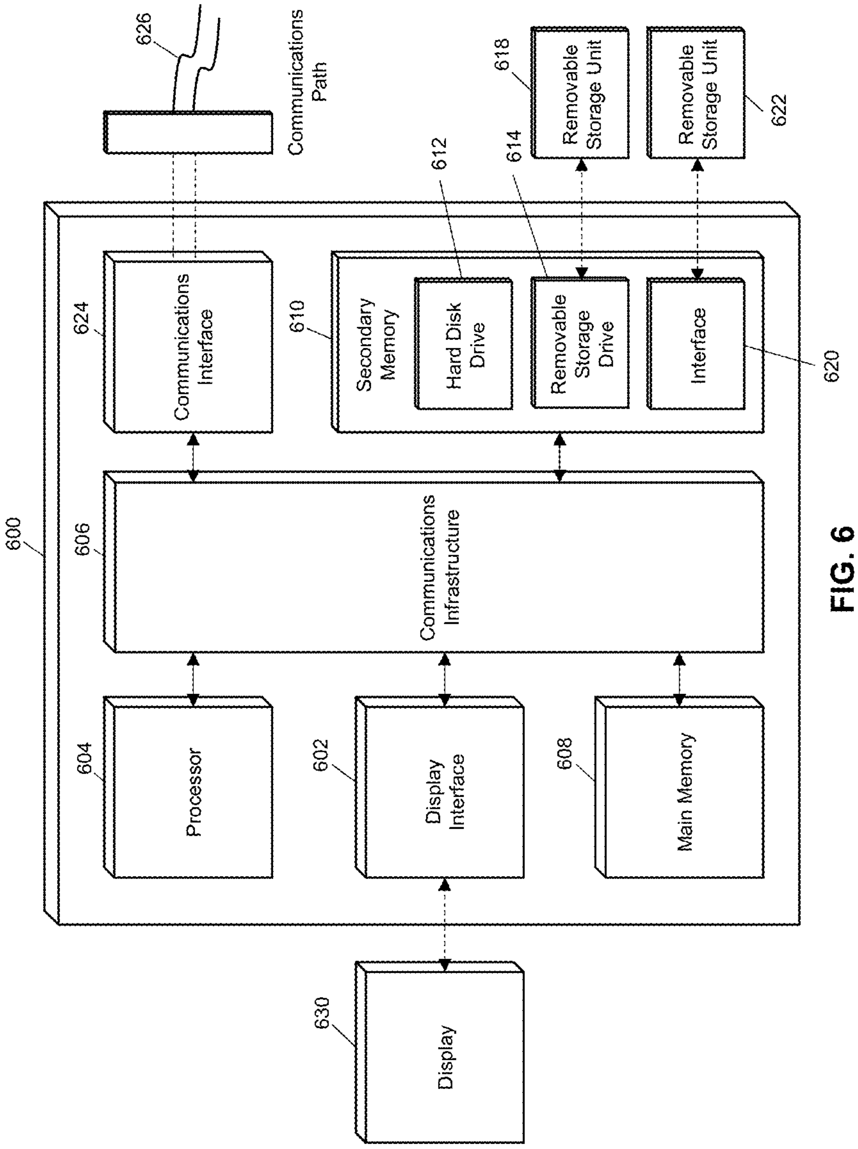
FIG. 6 is a block diagram illustrating a computer system architecture in accordance with exemplary embodiments.

First, an example way the three-dimensional representation of the dental object is generated will be discussed (FIGS. 1A-B). Second, an example way information about the offered products is collected, analyzed, and organized by the virtual marketplace will be discussed (FIGS. 2-4). Third, an example way specific cases are analyzed to determine one or more offered products to recommend will be discussed (FIG. 5A-B). Fourth, an example computer hardware that may perform one or more steps of the computerized method is discussed (FIG. 6).

System Overview for Generating a Digital Three-Dimensional Representation of a Dental Object During Scanning with a Dental Imaging Device FIG. 1A illustrates system 100 for generating a digital three-dimensional representation of a dental object during scanning with a dental imaging device in accordance with exemplary embodiments.

The imaging device 102 includes, for example, image data 103. The imaging device may be any imaging device capable of capturing, storing, compiling, and organizing visual data, e.g., the image data 103, and receiving and sending that data to and from other computing devices, such as the computing device 104, and/or the display device 106. In an exemplary embodiment, the imaging device 102 may be a dental imaging device such as an intra-oral scanning device. For example, the imaging device 102 may be a TRIOS or Lab dental scanner by 3Shape A/S, or any other intro-oral scanner as disclosed in WO 2002/16867 "Method and Apparatus for Three-Dimensional Optical Scanning of Interior Surfaces" filed on 24 Aug. 2001, WO 2010/048960 A1 "Scanner with Feedback Control" filed on 28 Oct. 2009, WO 2010/145669 "Focus Scanning Apparatus" filed on 17 Jun. 2010, WO 2012/083967 A1 "Optical System in 3D Focus Scanner" filed on 21 Dec. 2011, WO 2012/168322 "Dual-resolution 3D Scanner" filed on 6 Jun. 2012, WO 2013/010910 "Detection of a Movable Object when 3D Scanning a Rigid Object" filed on 12 Jul. 2012, WO 2013/132091 "3D Scanner with Steam Autoclavable Tip containing a Heated Optical Element" filed on 9 Mar. 2013, WO 2014/000745 "3D Intraoral Scanner measuring Fluorescence" filed on 27 Jun. 2013, WO 2014/125037 "Focus Scanning Apparatus Recording Color" filed on 13 Feb. 2014, WO 2018/172257 "3D Scanner System with Handheld Scanner" filed on 19 Mar. 2018, WO 2020/148041 "Wireless Scanning Device" filed on 13 Dec. 2019, U.S. Pat. No. 11,076,146 "Focus Scanning Apparatus" filed on 19 Mar. 2021, which are incorporated herein by reference in their entirety.

The image data 103 may be any visual data such as, but not limited to, initial scan patches and subsequent new scan patches of an object being imaged by the imaging device 102, e.g. the object 101. In an exemplary embodiment, the imaging device 102 is a dental imaging device as discussed above and the image data 103 includes depth data of the object being scanned. For example, the image data 103 may be 2.5-dimensional image data, e.g., contain depth and color data, or three-dimensional image data of the dental object, e.g. the object 101.

The computing device 104 includes, for example, a processor 110, a memory 120, a storage 130, and a three-dimensional object representation program 140. The device 104 may be a desktop computer, a notebook, a laptop computer, a tablet computer, a handheld device, a smart-phone, a thin client, or any other electronic device or computing system capable of storing, compiling, and organizing audio, visual, or textual data and receiving and sending that data to and from other computing devices, such as the imaging device 102, and/or the display device 240. For example, the computer system 600 illustrated in FIG. 6 and discussed in more detail below may be a suitable configuration of the computing device 104.

The processor 110 may include a graphics processing unit (GPU) 112. The processor 104 may be a special purpose or general purpose processor device specifically configured to perform the functions discussed herein. The processor 110 unit or device as discussed herein may be a single processor, a plurality of processors, or combinations thereof. Processor devices may have one or more processor "cores." In an exemplary embodiment, the processor 110 is configured to perform the functions associated with the modules of the three-dimensional object representation program 140 as discussed below. The GPU 112 may be specially configured to perform the functions of the three-dimensional object representation program 140 discussed herein. For example, in exemplary embodiments, the GPU 112 is configured to generate the three-dimensional object representations such as, but not limited to, the three-dimensional object representations 134.

The memory 120 can be a random access memory, read-only memory, or any other known memory configurations. Further, the memory 120 can include one or more additional memories including the storage 130 in some embodiments. The memory 120 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the three-dimensional object representation program 140. Computer programs, e.g., computer control logic, can be stored in the memory 120.

The storage 130 can include, for example, image data 103, and three-dimensional object representations 134. The storage 130 can be deployed on one or more nodes, e.g., storage or memory nodes, or one or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., image data 103, and three-dimensional object representations 134), and receiving and sending that data to and from other devices, such as the imaging device 102, and/or the display device 106. The storage 130 can be any suitable storage configuration, such as, but not limited to, a relational database, a structured query language (SQL) database, a distributed database, or an object database, etc. Suitable configurations and storage types will be apparent to persons having skill in the relevant art.

The three-dimensional object representations 134 can include a digital master three-dimensional representation 134*a*, a digital registration three-dimensional representation 134*b*, a digital visualization three-dimensional representation 134*c*, and a digital space exclusion representation 134*d*. A digital space exclusion three-dimensional representation is further described in WO 2013/010910 A1 filed on 12 Jul. 2012 by the same applicant, and is herein incorporated by reference in its entirety. The digital master three-dimensional representation 134*a* and the digital visualization three-dimensional representation 134*c* may be, for example, but not limited to a point cloud model, a signed distance model, a triangulated point cloud model, a collection of point clouds optionally with additional information such as uncertainty estimates or color(s), a collection of triangulated point clouds (aka scan patches), a volumetric representation such as a voxel model, a parametrized surface, a surface elements model, or any other suitable three-dimensional representational model. The digital master three-dimensional representation 134*a* may be a three-dimensional model based on all image data 103 received from the imaging device 102. The digital registration three-dimensional representation 134*b* may be a three-dimensional model used to register, e.g., add any new scan patches, received from the imaging device 102, which are then subsequently added to the other digital three-dimensional representations 134. The digital three-dimensional visualization representation 134*c* may be a three-dimensional model of the object 101 that is output to the display device 106 to be viewed by a user of the three-dimensional object representation program 140. The digital space exclusion representation 134*d* may be a three-dimensional model used to calibrate the image data 103 received from the imaging device 102. The three-dimensional object representations 134 are discussed in more detail below. In general, a three-dimensional representation is understood herein to either constitute or comprise one or more of the following: a point cloud, a point cloud with additional attributes such as point normals or point colors, a triangulated point cloud (a triangle mesh), a polygonal mesh, a volumetric representation/voxel model, parametric representations e.g. a spline representation.

The three-dimensional object representation program 140 is a software component that utilizes the image data 103 received from the imaging device 102 and/or stored in the storage 130 to generate the three-dimensional object representations 134 and then outputs a three-dimensional visualization output 162, e.g. the three-dimensional visualization representation 134*c*. In an exemplary embodiment, the three-dimensional object representation program 140 includes an image data receipt module 142, a three-dimensional representation generation module 144, a three-dimensional representation update module 146, a key frame selection module 148, a re-registration module 150, a space exclusion module 152, and a display module 154. The three-dimensional object representation program 140 is a software component specifically programmed to implement the methods and functions disclosed herein for generating a digital three-dimensional representation of a dental object during scanning with a dental imaging device. The three-dimensional object representation program 140 and the modules 144-154 are discussed in more detail below.

The three-dimensional object representation program 140 can include a graphical user interface 160. The graphical user interface 160 can include components used to receive input from the imaging device 102, the computing device 104, and/or the display device 106 and transmit the input to the three-dimensional object representation program 140 or conversely to receive information from the three-dimensional object representation program 140 and display the information on the computing device 104, and/or the display device 106. In an example embodiment, the graphical user interface 160 uses a combination of technologies and devices, such as device drivers, to provide a platform to enable users of the computing device 104, and/or the display device 106 to interact with the three-dimensional object representation program 140. In the example embodiment, the graphical user interface 160 receives input from a physical input device, such as a keyboard, mouse, touchpad, touchscreen, camera, microphone, etc. In an exemplary embodiment, the graphical user interface 160 may display a three-dimensional visualization representation output 162. While the graphical user interface 160 is illustrated as part of the display device 106, it can be appreciated that the graphical user interface 160 is a part of the three-dimensional object representation program 140 and may be a part of the computing device 104, and/or the display device 106.

While the processor 110, the memory 120, the storage 130, and the three-dimensional object representation program 140 are illustrated as part of the computing device 104, it can be appreciated that each of these elements or a combination thereof can be a part of a separate computing device.

The display device 106 can include the graphical user interface 160. The display device 106 be any computing device, such as, but not limited to, a cell phone, a server computer, a desktop computer, a notebook, a laptop computer, a tablet computer, a handheld device, a smart-phone, a thin client, or any other electronic device or computing system capable of receiving display signals from another computing device, such as the imaging device 102, and/or the computing device 104, etc. and outputting those display signals to a display unit such as, but not limited to, an LCD screen, plasma screen, LED screen, DLP screen, CRT screen, etc. For example, the graphical user interface 160 may receive the three-dimensional visualization representation output 162 from the three-dimensional object representation program 140 and display the three-dimensional visualization representation output 162 on the display device 106. Further, the graphical user interface 160 may receive data input files, e.g., the image data 103, from a user and transmit those data input files, e.g., the image data 103, to the three-dimensional object representation program 140. The data input files e.g., the image data 103, can include a single piece of data (e.g., a single scan patch from the imaging device 102) or multiple pieces of data (e.g., a plurality of scan patches from the imaging device 102). The display device 106 may communicate with the imaging device 102, and/or the computing device 104 via a hard-wired connection or via the network 108. For example, the display device 106 may have a hard-wired connection to the image device such as, but not limited to, a USB connection, an HDMI connection, a display port connection, a VGA connection, or any other known hard-wired connection capable of transmitting and/or receiving data between the imaging device 102, the computing device 104, and/or the display device 106.

While the display device 106 is illustrated as being separate from the imaging device 102, and the computing device 104, it can be appreciated that the display device 106 can be a part of the imaging device 102, and/or the computing device 104. For example, the computer system 600 illustrated in FIG. 6 and discussed in more detail below may be a suitable configuration of the imaging device 102, the computing device 104, and/or the display device 106.

The optional network 108 may be any network suitable for performing the functions as disclosed herein and may include a local area network (LAN), a wide area network (WAN), a wireless network (e.g., WiFi), a personal area network (PAN) (e.g. Bluetooth), a near-field communication (NFC) network, a mobile communication network, a satellite network, the Internet, fiber optic, coaxial cable, other hardwired networks, infrared, radio frequency (RF), or any combination of the foregoing. Other suitable network types and configurations will be apparent to persons having skill in the relevant art. In general, the network 108 can be any combination of connections and protocols that will support communications between the imaging device 102, the computing device 104, and/or the display device 106. In some embodiments, the network 108 may be optional based on the configuration of the imaging device 102, the computing device 104, and the display device 106.

Referring to FIG. 1B illustrates an example system 100 for generating a digital three-dimensional representation of a dental object real-time during scanning with a dental imaging device. The object 101 may be any object capable of being scanned by the imaging device 102. In an exemplary embodiment, the object 101 is an oral cavity or any part of an oral cavity including, but not limited to, dentition, gingiva, retromolar trigone, hard palate, soft palate, and floor of the mouth, etc. The imaging device 102 may capture 2.5-dimenisonal data, e.g. the image data 103, of the object 101 and transmit that data to the computing device 104. The three-dimensional object representation program 140 receives the image data 103 from the imaging device 102 and generates and continually updates the three-dimensional object representations 134 in real-time, as discussed in more detail below. The three-dimensional object representation program 140 may output the digital three-dimensional visualization representation 134*c* to the display device, e.g., via the graphical user interface 160, as the visualization representation output 162.

Example Process for Creating Catalogs

FIG. 2 illustrates a process for generating a lab-specific catalog for a certain lab based upon a master catalog. The master catalog has a list of product types that may be offered and has (or is associated with) a closed list of attributes about those product types. The lab-specific catalog is created by a user on behalf of a lab such that a standardized listing of items, organized by product type and with associated attributes, is known to the system. This lab-specific catalog may be used, as discussed below, in regards to generating product-specific catalogs, assisting in completion of an order form for a preferred lab, or for other purposes.

It should be appreciated that the master catalog and lab-specific catalog discussed herein are disclosed with reference to dental labs and dental products, this is only an example embodiment of the invention. Other embodiments may be directed to other types of products, other types of manufacturers/creators, and the like.

In Step 202, a master catalog is presented, via a graphical user interface (GUI), to the user such that the user can select one or more items that are or will be offered by the corresponding lab. The lab may offer one or more items, each having one or more attributes about the item. The master list contains all product types in a list of product types from which the user may select. Within the product type may be a list of specific items (e.g., specific products) for that product type. The user may select from a dropdown list or provide some other input of one or more items within the product type.

The master catalog may additionally allow the user to input optional additional products (such as in a text string) that are not in the master catalog (e.g., of a product type not currently in the master catalog, or an item for that product type not currently in the master catalog). The optional additional products allows for flexibility to the lab to offer additional products that are not commonly offered and/or are new. The master catalog have an associated graphical user interface (GUI) such as shown in FIGS. 3A-B.

In Step 204, the user selects among a closed list of attributes for the one or more items selected in Step 202. The closed list of attributes allows the user to select which attributes are possible for the item. This will allow for a clinic ordering the item to provide the needed information about the item, so as to minimize the need for additional communication between clinic and lab after the ordering. It may also help reduce the need for the patient to return to the clinic such that the clinic may gather additional information that was not gathered originally while the patient was in the clinic. The closed list of attributes may be a large list of generic attributes, so as to help labs create the catalogue and help clinics understand and use the catalogue.

There are numerous examples of attributes within the closed list of attributes. These may include materials (e.g., the material out of which the product will be made, coated, or treated), process type (e.g., the process by which the product will be made, such as additive or subtractive manufacturing), color/shade (e.g., the shade of the tooth to be repaired or replaced, such as VITA guide colors), design choices (e.g., any of various design choices that the clinic may select for that product), schedule (e.g., how long the product will typically take for the lab to product), price, shipping, and availability (such as geographic or other conditional availability for the product). Other attributes may be added to the closed list of attributes. In some embodiments, the user may be invited to provide additional attributes beyond the closed list, such as specific, unusual, or proprietary attributes.

This step may include receiving, from a first lab, a first set of offered products; and receiving, from a second lab, a second set of offered products. The two or more labs each provide their set of offered products according, at least partially, to the closed list of attributes.

In Step 206, a lab-specific catalog is generated for the lab, based at least in part on the offered products selected for the lab as well as the attributes for those offered products. An offered product may be an item within a product type having one or more attribute about it.

The lab-specific catalog may be generated, at least in part, based upon the completion of various forms or submissions in a graphical user interface. Examples of the computer interface are shown in FIG. 3A and FIG. 3B.

FIG. 3A illustrates an introductory graphical user interface for the dental lab to input what products it offers. In the example user interface, the user begins to complete the product catalog on behalf of the lab. The user is invited to provide information about the products provided by the lab. The user is shown product types available for selection. In the example, these product types include "single units," "bridges," "bar bridges," "removables," "appliances," and "orthodontics." Upon selection of a product type, specific items within the product type are shown. In FIG. 3A, as an example, upon selection of product type "single units" the user is presented with three possible items within that category, including "crown," "inlay/onlay," and "veneer."

FIG. 3B illustrates a graphical interface inviting the dental lab to provide additional information about each of the offered products. Examples FIG. 4 illustrated a process for generating a product-specific catalog based upon one or more lab-specific catalogs (such as produced as described with regards to FIG. 2). The product-specific catalogs contain information about the product offerings for a certain product or product type.

In step 402, the dental labs inputs information related to offered products into a computer interface, as described above in FIG. 2. In the example of FIG. 4, three labs (labeled as "Lab 1," "Lab 2," and "Lab 3") have completed and submitted their lab-specific catalogs. In this example, Lab 1 offers products A, B, and C (shown as 1A, 1B, and 1C); Lab 2 offers products A, B, and D (shown as 2A, 2B, and 2D); and Lab 3 offers products A and D (shown as 3A and 3D). Each product may have one or more attributes (not shown in FIG. 4).

In Step 404, the dental lab sends the information to the virtual marketplace. As such, there is one centralized location with all the completed lab-specific catalogs, in a standardized format. The clinic is typically the customer of the virtual marketplace, as the clinic will select or otherwise utilize a lab for the creation of a dental product.

In Step 406, the virtual marketplace analyzes the offered products of two or more labs and organizes the offered products into one or more product-specific catalogs 408. The product-specific catalogs are arranged by the product or product type. In the example shown, Product Catalog A contains offered products from the different labs with in the category A. Thus, Product Catalog A may be used by labs considering a product of that product type.

Example Process for Facilitating Orders Via the Catalogs

FIGS. 5A-5B illustrates a process for facilitating orders via one or more catalogs (such as those generated in FIGS. 2 and/or 4 discussed above).

In some embodiments, the method of FIG. 5A may be used in addition to the

FIG. 5A shows a method of facilitating an order via a product-specific catalog. In these embodiments, a preferred lab may not have been set up, or may be unavailable for the product. The user may also request a comparison between a preferred lab and other possible labs (such as to compare prices or other attributes).

In step 502, the virtual marketplace receives a case from a dental provider. The case may be complete or partial. The case may include a model of teeth, such as determined as discussed above in FIGS. 1A-B. The model of teeth may include shape information, shade information, segmentation, hard-tissue information, soft-tissue information, or other information. The model of teeth may also include a potential diagnosis, generated automatically or input by a human operator.

This may include receiving, from a dental provider, a digital scan model indicative of a dental condition and a course of treatment of a patient.

In Step 504, the virtual marketplace analyzes the case and generates a treatment plan. The treatment plan may designate one or more products needed to treat the diagnosis. In other embodiments, the treatment plan may be received from the dental provider along with the case. This may include determining, based at least in part on the digital scan model, a course of treatment for the patient based at least in part on the digital scan model.

In Step 506, the virtual marketplace determines a product catalog associated with the treatment plan. The virtual marketplace may consider various attributes for the product catalog.

In Step 508, the virtual marketplace analyzes the offered products within the product catalog. This step may include considering attributes for fitness to the treatment plan or are otherwise desirable (e.g., having a low price or short delivery time). The virtual marketplace may analyze which of one or more products within the offered products of the product catalog are best suited for the treatment plan. The virtual marketplace may also analyze what attributes the product should have. In this way, some labs may be eliminated from contention (e.g., if they lack the specific product or an attribute thereof that is needed) and other labs may be bolstered (e.g., they offer the specific product having the needed attributes).

In Step 510, the virtual marketplace recommends at least one product from the offered products of the product catalog to the dental provider. The virtual marketplace may send, to the first lab, the selection of the first recommended product, the digital scan model, and/or an additional data set. The additional data set may include one or more attributes of the product. The product may be sent along with a product offer and/or order form for the product. The product offer may include information about the recommended lab or labs for the product. The order form may request information to formalize and/or finalize the order.

If more than one lab offers a product that meets the criteria, more than one lab may be recommended associated with that product. The labs may be ranked based upon any of various criteria (e.g., prior usage, geographic location, price, user reviews, delivery time, quality, or some combination thereof).

The virtual marketplace may also send a request for additional information, so as to meet the attributes needed for an ordering. For example, if the lab requires a certain additional information, such as a frontal picture of the patient's face, a request for this additional information will be sent to the dental provider. Other examples of additional information may include a set of tooth shade information, a treatment plan, a final goal model, and a questionnaire.

In Step 512, the virtual marketplace receives an order form confirmation and/or the additional information from the dental provider and sends that information to the dental lab. In some embodiments, the selected lab may thereafter be saved as a preferred lab (such as discussed in regard to FIG. 5B) for future orders of the products. The lab will then complete the manufacture of the product based upon the completed order form, the case, and/or the additional information.

FIG. 5B shows a method of completing an order based upon a lab-specific catalog. In these embodiment, the lab which will complete the order has been preselected and embodiments of the invention facilitate the ordering process.

In Step 552, the virtual venue receives, from a user on behalf of a clinic and via a graphical user interface, an indication of a preferred lab and sets the preferred lab for that product type. The preferred lab may be selected based upon a list of available labs (e.g., based upon an existing relationship between the clinic and the lab), or based upon a list of recommended labs (such as described about in FIG. 5A).

In Step 554, the virtual venue pulls attributes from the lab-specific catalog for the preferred lab and/or from the preferred lab itself. The attributes may be indicative of information needed to complete the order correctly. The attributes may need input from the user completing the order form, such as to know various information that will be needed in completing the order. The attributes may be specific to items, information, pictures, colors, materials, or the like.

It should be appreciated that in some instances, this step may take place after a recommended product was sent to the clinic, such as was discussed in reference to FIG. 5A.

In Step 556, the processor adds attributes from the preferred lab to the workflow that will be used to generate an order. For example, the workflow may add a requirement to take a picture of the face of the patient during the completion of the workflow. As another example, the workflow may add a requirement to determine a tooth shade during the completion of the workflow. Adding these requirements to the workflow reduces redundancies and reduces the need to have a patient return or answer additional questions after leaving the dental clinic.

This typically relates to the sequence of obtaining the 3D scan using the intraoral scanner. The user is guided through different steps of data acquisition depending on the treatment plan. For example. If the patient needs a crown restoration, that workflow may adapt the data acquisition sequence to include a pre-op scan, before the dentist is preparing the damaged tooth and creating an additional scan of the prep-site (the tooth where the crown will be places). The pre-op scan (of the damaged tooth) may be used by the lab to create a restoration with similarities to the old tooth, such as staining, shade, placement of cusps, fissures etc In Step 558, the processor receives an indication to being a new project for that product type. This may include receiving a digital model of a set of patient teeth. In Step 560, the processor completes an order form for the product type using the attributes that were added to the workflow. By adding the attributes before sending to the lab, the order form is more standardized, so as to reduce the need for clarification questions and requests for additional information from the clinic.

In Step 562, the processor sends the completed order form to the preferred lab, complete with the attributes as requested in the lab-specific catalog.

Computer System Architecture

FIG. 6 illustrates a computer system 600 in which embodiments of the present disclosure, or portions thereof, may be implemented as computer-readable code. For example, the imaging device 102, the computing device 104, and/or the display device 106 of FIG. 1A may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 1A-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 410. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the processes and methods as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generating a digital three-dimensional representation of a dental object during scanning with a dental imaging device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. Although operations can be described as a sequential process, some of the operations can in fact be performed in parallel, concurrently, and/or in a distributed environment, and with program code stored locally or remotely for access by single or multiprocessor machines. In addition, in some embodiments the order of operations can be rearranged without departing from the spirit of the disclosed subject matter. It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

The invention claimed is:

1. A computerized method comprising:

generating a workflow for determining a treatment plan of a patient by:

receiving, from a first lab, a first set of offered products;

receiving, from a second lab, a second set of offered products;

receiving, from a dental provider, a digital scan model indicative of a dental condition and a course of treatment of the patient;

extracting attributes from the first and second set of offered products;

evaluating the extracted attributes for fitness to the course of treatment;

selecting one or more attributes based on the evaluation; and introducing the one or more selected attributes and the digital scan model into the workflow;

determining, based at least in part on the workflow, a treatment plan for the patient;

sending, to the dental provider, a first recommended product from the first set of offered products and a second recommended product from the second set of offered products based on the workflow;

receiving, from the dental provider, a selection of the first recommended product and an additional data set associated with requirements for the first recommended product;

introducing the selected first recommended product and the additional data set into the workflow; and sending, to the first lab, the selection of the first recommended product, the digital scan model, and the additional data set.

2. The computerized method of claim 1, wherein the additional data set includes an attribute such that the first lab can complete the first recommended product.

3. The computerized method of claim 1, wherein the first set of offered products includes an attribute indicative of availability for at least one product in the first set of offered products.

4. The computerized method of claim 1, wherein the first set of offered products includes an attribute indicative of price for at least one product in the first set of offered products.

5. The computerized method of claim 1, wherein sending the first recommended product includes sending at least one of an availability indication and a price indication for the first recommended product.

6. The computerized method of claim 1, wherein the first recommended product and the second recommended product are each selected based at least in part on the treatment plan.

7. The computerized method of claim 1, wherein the first recommended product and the second recommended product are each a dental prosthesis.

8. The computerized method of claim 1, wherein the additional data set includes at least one of a photograph of the patient, a set of tooth shade information, a treatment plan, a final goal model, and a questionnaire.

9. The computerized method of claim 1, further comprising:

sending, to the dental provider, a request for the additional data set based upon receiving the selection of the first recommended product, wherein sending the first recommended product includes sending information related to the additional data set.

10. The computerized method of claim 9, wherein first recommended product is custom manufactured based at least in part on the additional data set.

11. The computerized method of claim 1, wherein the one or more selected attributes and the fitness evaluation for the course of treatment are stored in computer memory.

12. The computerized method of claim 1, wherein the extracted attributes include material, process type, color/shade, design choice, schedule, price, shipping, and/or availability.

13. A computerized method for generating a treatment plan, the method comprising:

receiving, by a workflow processor:

a digital scan model indicative of a dental condition and a course of treatment from a dental provider device; and data related to offered products from a lab device;

causing the workflow processor to:

extract attributes from the offered products data, evaluate the extracted attributes for fitness to the course of treatment, select an attribute based on the evaluation, and generate or modify a workflow including the selected attribute and the digital scan model;

generate a treatment plan including a list of recommended products, and introduce the treatment plan into the workflow;

transmit the workflow to the dental provider device;

receive, from the dental provider device, data representative of a selected product and a requirement related to the list of recommended products;

introduce the data representative of the selected product and the requirement related to the list of recommended products into the workflow; and transmit the workflow to the lab device; and generating, by the lab device, a dental prothesis based on the selected product and the digital scan model.

14. A system for generating a treatment plan, the system comprising:

a lab device configured to generate data related to offered products;

a dental provider device configured to generate a digital scan model indicative of a dental condition and a course of treatment; and a workflow processor configures to receive: i) the digital scan model and the course of treatment; ii) the offered products data; iii) extract attributes from the offered products data; iv) evaluate the extracted attributes for fitness to the course of treatment; v) select an attribute based on the evaluation; vi) generate or modify a workflow including the selected attribute and the digital scan model; vii) generate a treatment plan including a list of recommended products; viii) introduce the treatment plan into the workflow; ix) transmit the workflow to the dental provider device; x) receive, from the dental provider device, data representative of a selected product and a requirement related to the list of recommended products; xi) introduce the data representative of the selected product and the requirement related to the list of recommended products into the workflow; and xii) transmit the workflow to the lab device;

wherein the lab device is configured to generate a dental prothesis based on the selected product and the digital scan model.

15. The system of claim 14, wherein:

the workflow processor is configured to generate instructions for display by the dental provider device as a guide for generating a digital scan based on the treatment plan.

16. The system of claim 14, the workflow processor is configured to store the selected one or more attributes and the fitness evaluation for the course of treatment in memory.

17. The system of claim 14, wherein the extracted attributes include material, process type, color/shade, design choice, schedule, price, shipping, and/or availability.

* * * * *